US009164541B2

(12) United States Patent
Chen

(10) Patent No.: US 9,164,541 B2
(45) Date of Patent: Oct. 20, 2015

(54) NOTEBOOK COMPUTER WITH SLIDABLE AND ROTATABLE SCREEN PANEL

(71) Applicant: ShenZhen Goldsun Network Intelligence Technology Co., Ltd., Shenzhen (CN)

(72) Inventor: Si-Wei Chen, Shenzhen (CN)

(73) Assignee: ShenZhen Goldsun Network Intelligence Technology Co., Ltd., ShenZhen (CN)

( * ) Notice: Subject to any disclaimer, the term of this patent is extended or adjusted under 35 U.S.C. 154(b) by 153 days.

(21) Appl. No.: 14/065,440

(22) Filed: Oct. 29, 2013

(65) Prior Publication Data

US 2014/0185224 A1 Jul. 3, 2014

(30) Foreign Application Priority Data

Dec. 27, 2012 (CN) .......................... 2012 1 05777366

(51) Int. Cl.
*G06F 1/16* (2006.01)

(52) U.S. Cl.
CPC ............ *G06F 1/1624* (2013.01); *G06F 1/1622* (2013.01); *G06F 1/1654* (2013.01); *G06F 1/1681* (2013.01)

(58) Field of Classification Search
CPC .............................. G06F 1/1622; G06F 1/1624
See application file for complete search history.

(56) References Cited

U.S. PATENT DOCUMENTS

| 5,085,394 | A | * | 2/1992 | Torii ............................ 248/455 |
| 5,209,448 | A | * | 5/1993 | Hatanaka et al. ............ 248/455 |
| 5,548,478 | A | * | 8/1996 | Kumar et al. ............ 361/679.27 |
| 6,404,622 | B1 | * | 6/2002 | Chen ........................ 361/679.28 |
| 6,903,927 | B2 | * | 6/2005 | Anlauff ..................... 361/679.28 |
| 7,019,964 | B1 | * | 3/2006 | Maskatia et al. ......... 361/679.27 |
| 7,184,263 | B1 | * | 2/2007 | Maskatia ................. 361/679.27 |
| 2006/0104013 | A1 | * | 5/2006 | Sakakibara et al. .......... 361/680 |
| 2008/0081505 | A1 | * | 4/2008 | Ou et al. ........................ 439/374 |
| 2008/0180892 | A1 | * | 7/2008 | Lai ................................ 361/680 |
| 2010/0124004 | A1 | * | 5/2010 | Ahn et al. ................ 361/679.01 |
| 2011/0012931 | A1 | * | 1/2011 | Abe .............................. 345/671 |
| 2012/0162889 | A1 | * | 6/2012 | Han ........................ 361/679.09 |
| 2012/0268880 | A1 | * | 10/2012 | Tomita et al. ............. 361/679.09 |
| 2012/0308296 | A1 | * | 12/2012 | Li et al. ........................... 403/81 |
| 2014/0085792 | A1 | * | 3/2014 | Lu et al. ................... 361/679.08 |
| 2014/0185196 | A1 | * | 7/2014 | Oakley ..................... 361/679.01 |

* cited by examiner

*Primary Examiner* — Anthony Q Edwards
(74) *Attorney, Agent, or Firm* — Novak Druce Connolly Bove + Quigg LLP

(57) ABSTRACT

A notebook computer is provided. The notebook computer includes a screen panel, a main body, two connecting members, and two shafts. The connecting members connect the screen panel to the main body. The screen panel rotates relative to the main body. The main body defines two slide channels and a receiving space. A depth of the receiving space is greater than a depth of the slide channel, a pair of guiding grooves is defined in two opposite inner sidewalls of each slide channel, and a hole is defined in each inner sidewall of each slide channel at an end of corresponding guiding groove adjacent to a bottom of the receiving space and communicating with the corresponding guiding groove. The screen panel is slidable relative to the main body on and along the slide channels.

10 Claims, 7 Drawing Sheets

NOTEBOOK COMPUTER WITH SLIDABLE AND ROTATABLE SCREEN PANEL

BACKGROUND

1. Technical Field

The present disclosure relates to notebook computers, and more particularly to a notebook computer with an adjustable screen panel.

2. Description of Related Art

Screens of notebook computers are fixedly attached to a main body of the notebook computer and cannot slide relative to the main body. Therefore, there is room for improvement in the art.

DETAILED DESCRIPTION

Figure 1:
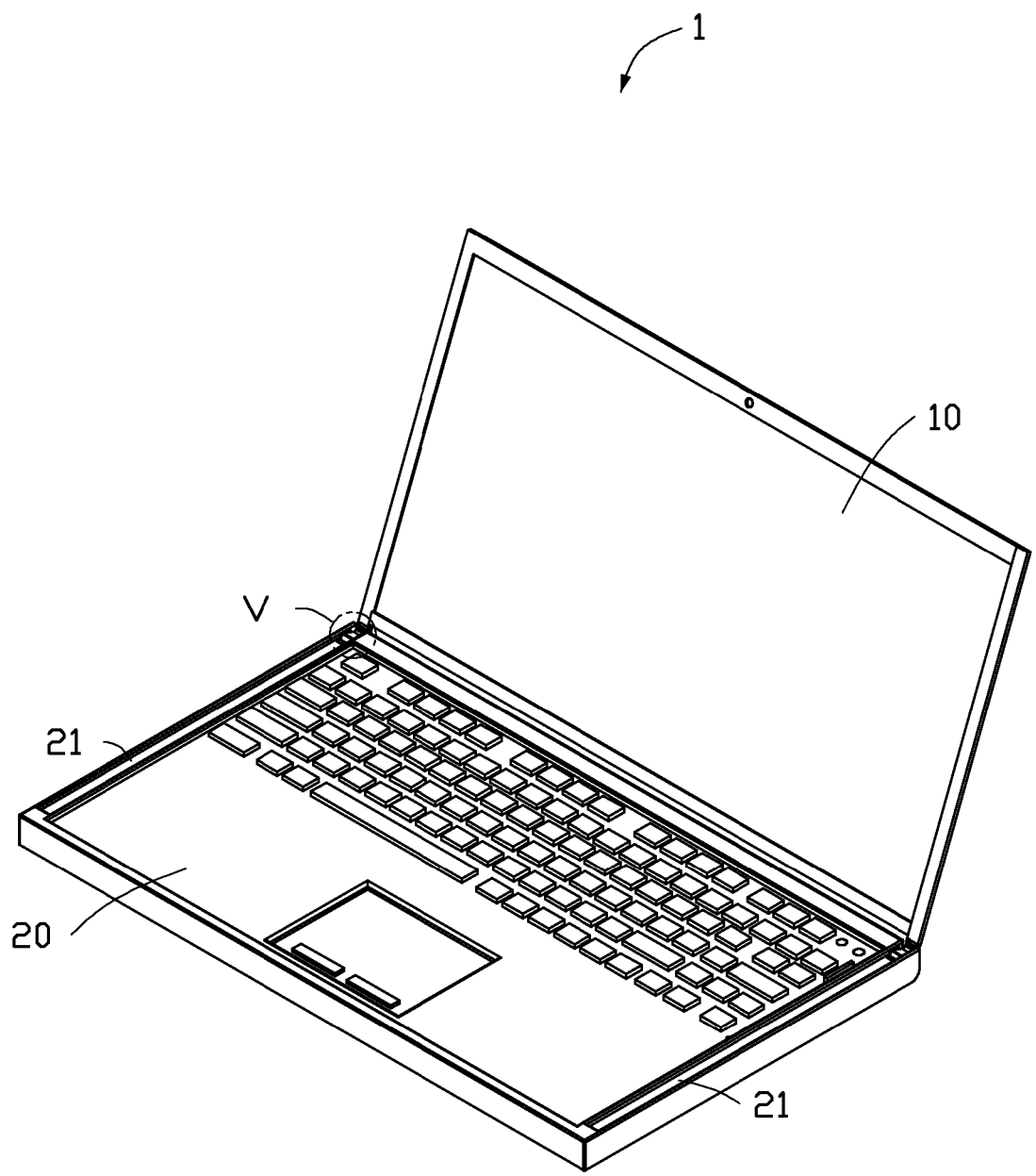
FIG. 1 is an isometric view of a notebook computer in accordance with an exemplary embodiment of the present disclosure, wherein a screen panel of the notebook computer is in a first deployed position.
Figure 2:
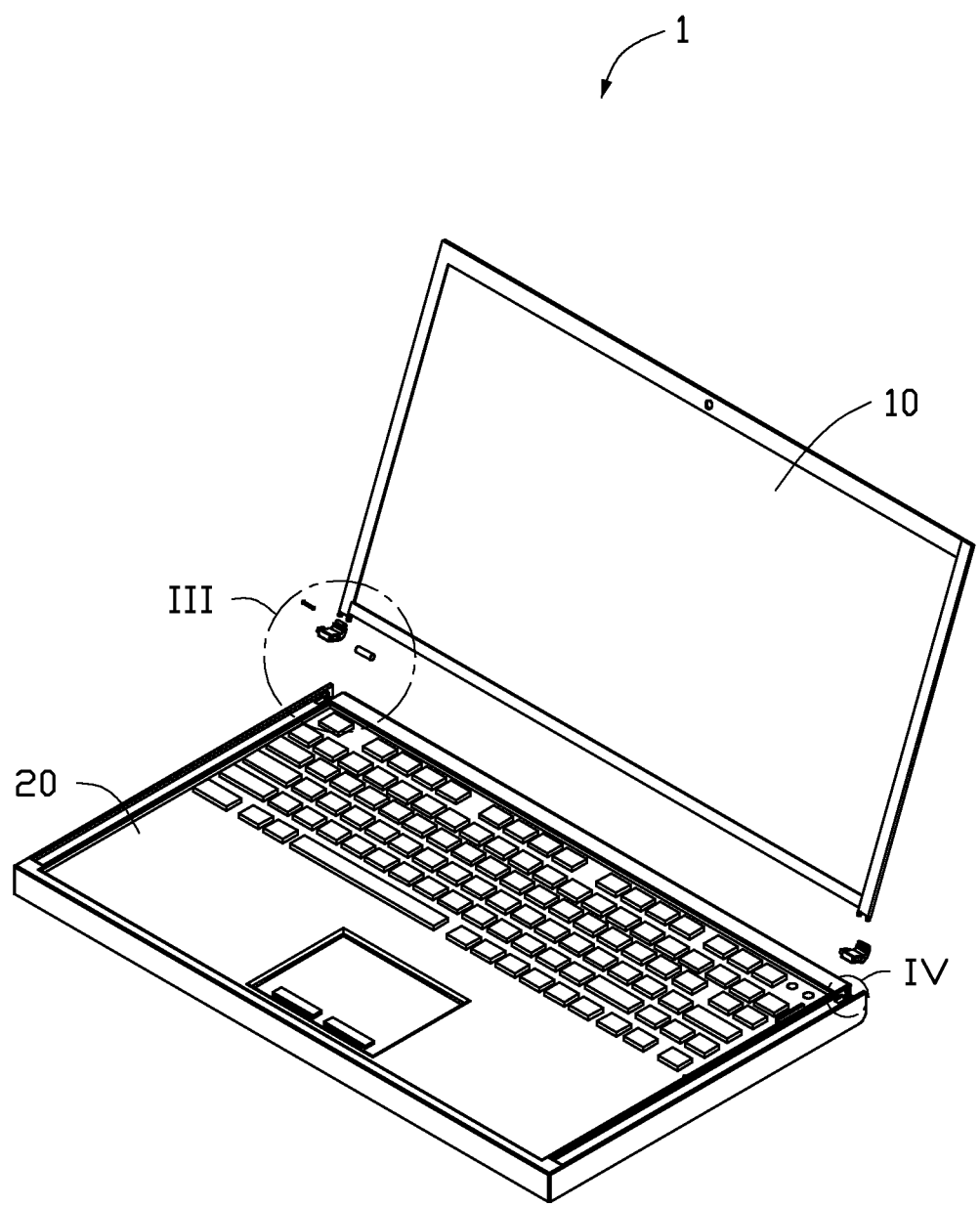
FIG. 2 is an exploded view of the notebook computer of FIG. 1.
Figure 3:
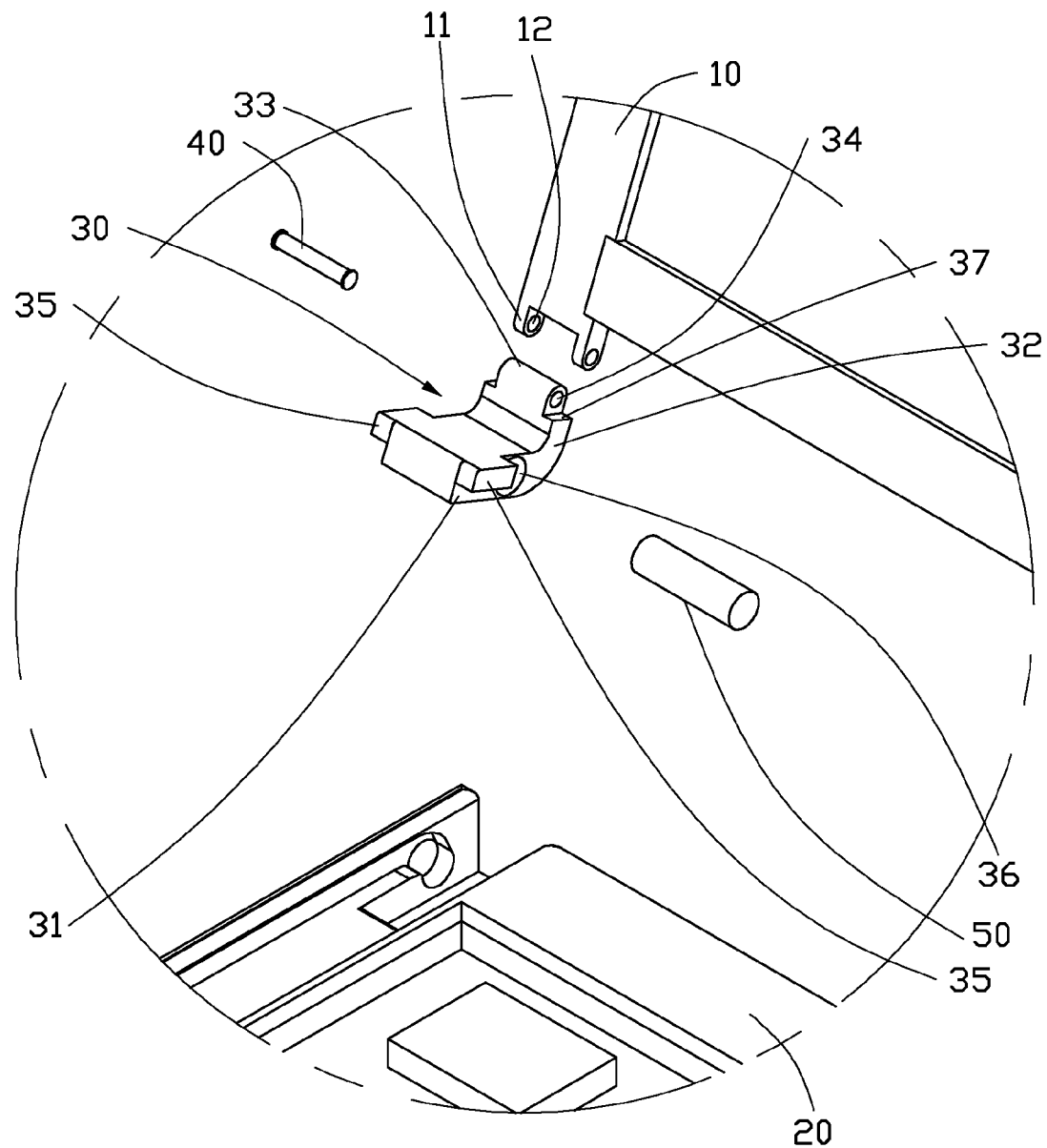
FIG. 3 is an enlarged view of a circled portion III of FIG. 2.
Figure 4:
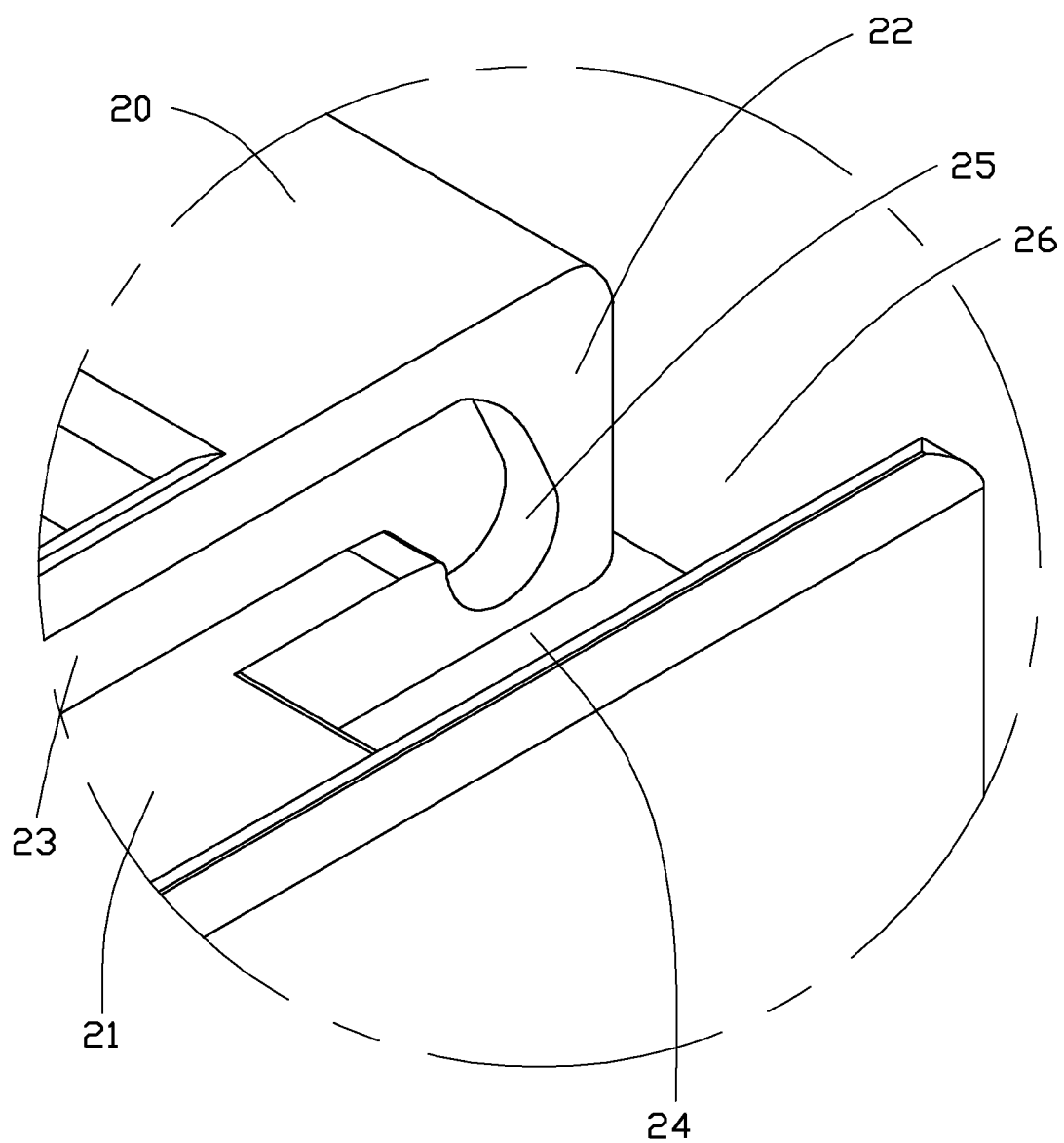
FIG. 4 is an enlarged view of a circled portion IV of FIG. 2.

FIGS. 1 through 5 show a notebook computer 1 in accordance with an exemplary embodiment of the present disclosure. The notebook computer 1 includes a screen panel 10 for displaying information for a user, a main body 20, two connecting members 30, two first shafts 40, and two second shaft 50. In another embodiment, the second shaft 50 is replaced by two circular protruding blocks, and the two circular protruding blocks are a part of the connecting member 30 and located on two sides of the connecting member 30. The connecting member 30 connects the screen panel 10 to the main body 20. The main body 20 includes a keyboard (not shown), a touchpad (not shown), and a circuit board (not shown). An upper surface of the main body 20 defines two slide channels 21 at two sides of the main body 20, respectively. The screen panel 10 is slidable relative to the main body 20 on and along the two slide channels 21.

Two pairs of protrusions 11 extend from two ends, respectively, of one side of the notebook computer 1 adjacent to the main body 20. Each pair of spaced protrusions 11 defines two oppositely-facing through holes 12.

The connecting member 30 includes a block 31 and a back 32 slanted relative to the block 31. The connecting member 30 is chair-shaped. In the embodiment, the connecting member 30 is a unitary body. A distal end 33 of the back 32 is rounded and defines a through hole 37. Two steps 37 corresponding to one pair of protrusions 11 are formed on the back 32 at two sides of the through hole 37, respectively. Two rectangular protruding blocks 35 extend from two sides of the block 31, respectively. The block 31 defines a through hole 36 adjacent to the two rectangular protruding blocks 35. In the embodiment, the block 31 is substantially cuboid.

A receiving space 24 communicating with the slide channel 21 is defined in an end of each slide channel 21. A depth of the receiving space 24 is greater than a depth of the slide channel 21. A pair of guiding grooves 23 is formed in two opposite sidewalls 22 of the slide channel 21. A substantially circular hole 25 communicating with the guiding groove 23 is defined at an end of each guiding groove 23 adjacent to a bottom of the receiving space 24. In the embodiment, a size and shape of the two guiding grooves 23 are the substantially the same, and a size and shape of the two rectangular protruding blocks 35 are the same. A thickness of each rectangular protruding block 35 is less than a width of the guiding groove 23.

The shaft 40 is received in the two opposite through holes 12 of the protrusions 11 and the through hole 37 of the back 32, such that the distal end 33 is rotatably engaged between the pair of protrusions 11. Therefore, the screen panel 10 is rotatable relative to the connecting member 30. The second shaft 50 is received in the through hole 36 of the block 31, and two ends of the second shaft 50 are received in the two opposite guiding grooves 23. A diameter of the second shaft 50 is substantially equal to the width of the guiding groove 23.

Figure 5:
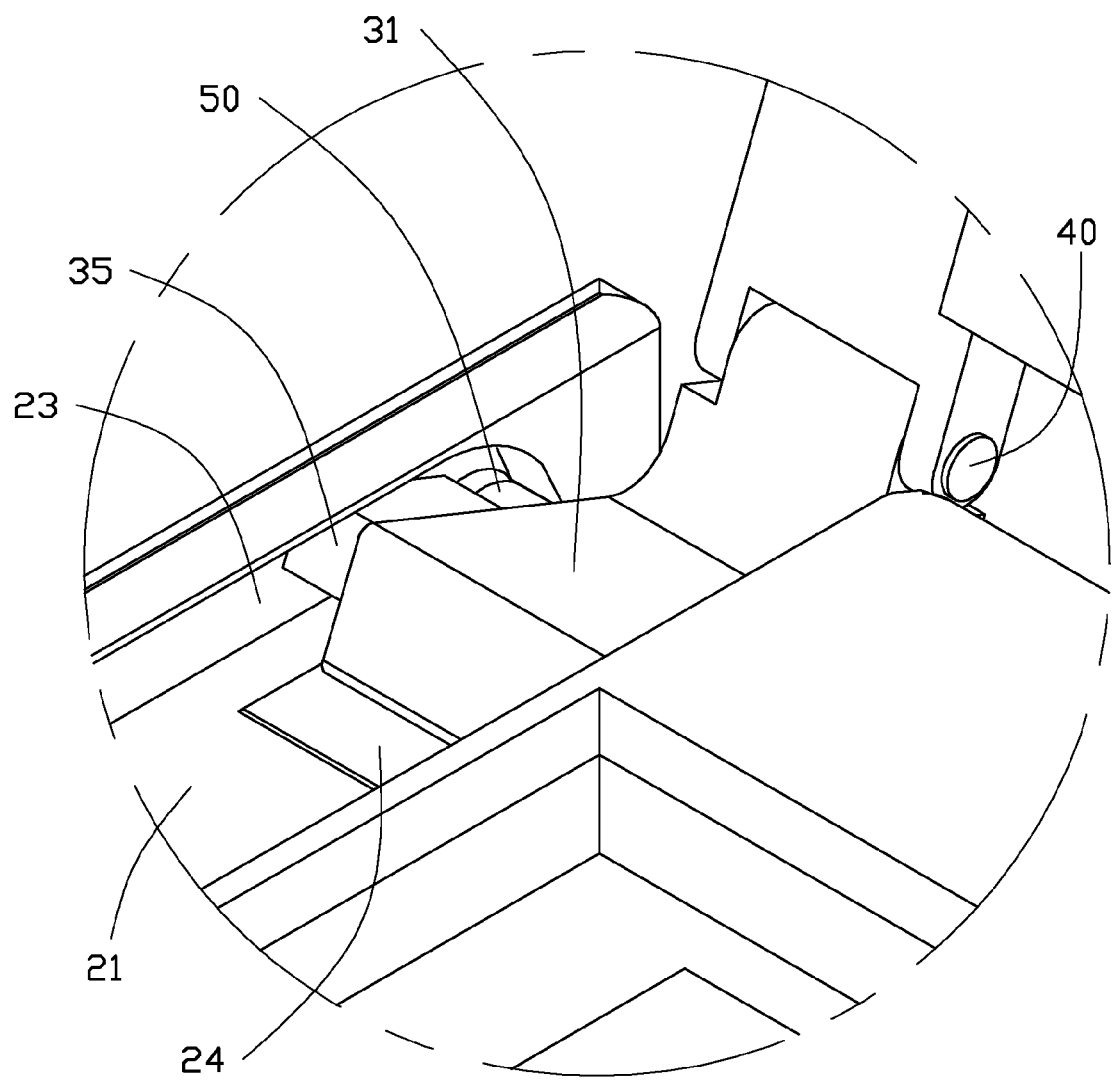
FIG. 5 is an enlarged view of a circled portion V of FIG. 1.

Referring to FIG. 5, the receiving space 24 receives the connecting member 30. In a first deployed position, the two ends of the second shaft 50 are engagingly received in the two opposite holes 25, and the block 31 tilts relative to a bottom of the slide channel 21. Therefore, the connecting member 30 is retained in the first deployed position. Furthermore, when the notebook computer 1 is folded shut, the connecting member 30 is retained in the receiving space 24.

Figure 6:
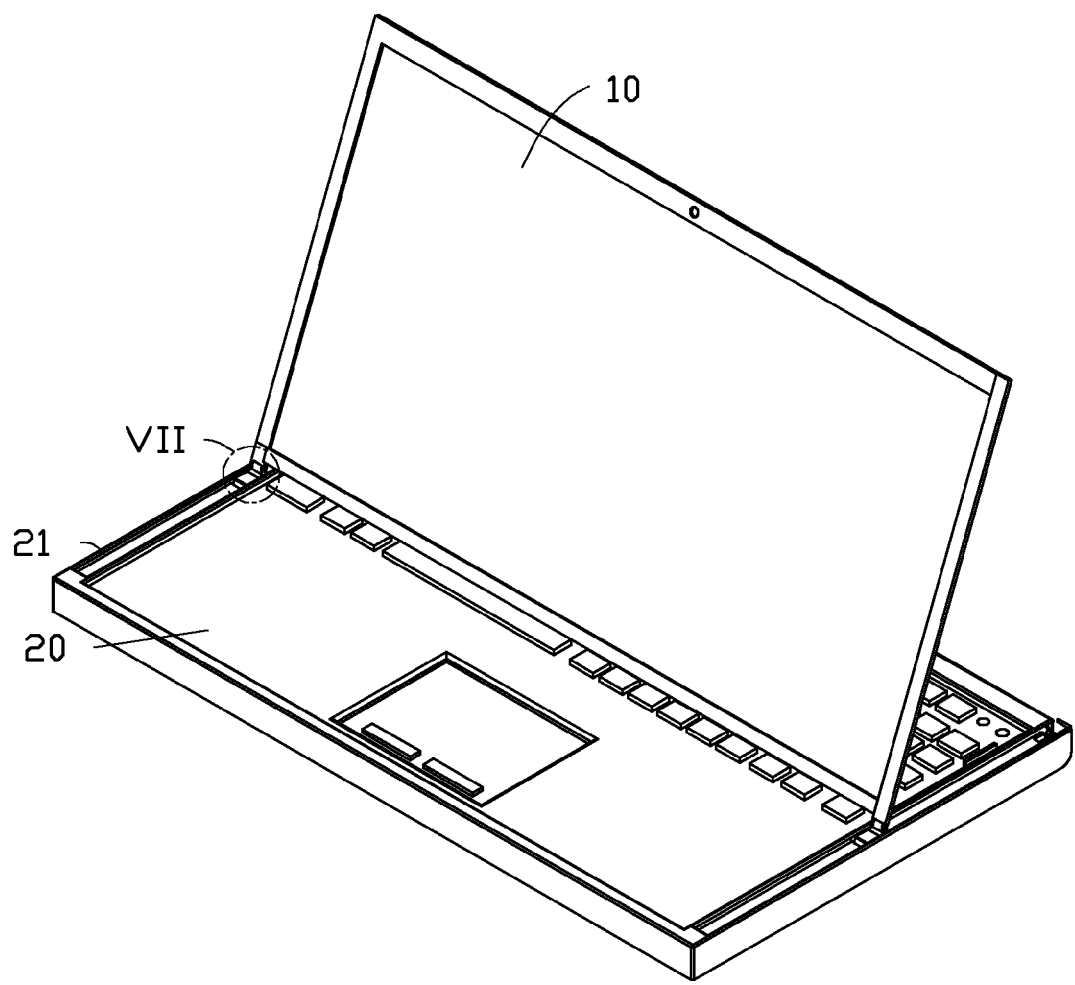
FIG. 6 is similar to FIG. 1, but shows the screen panel in a second deployed position.
Figure 7:
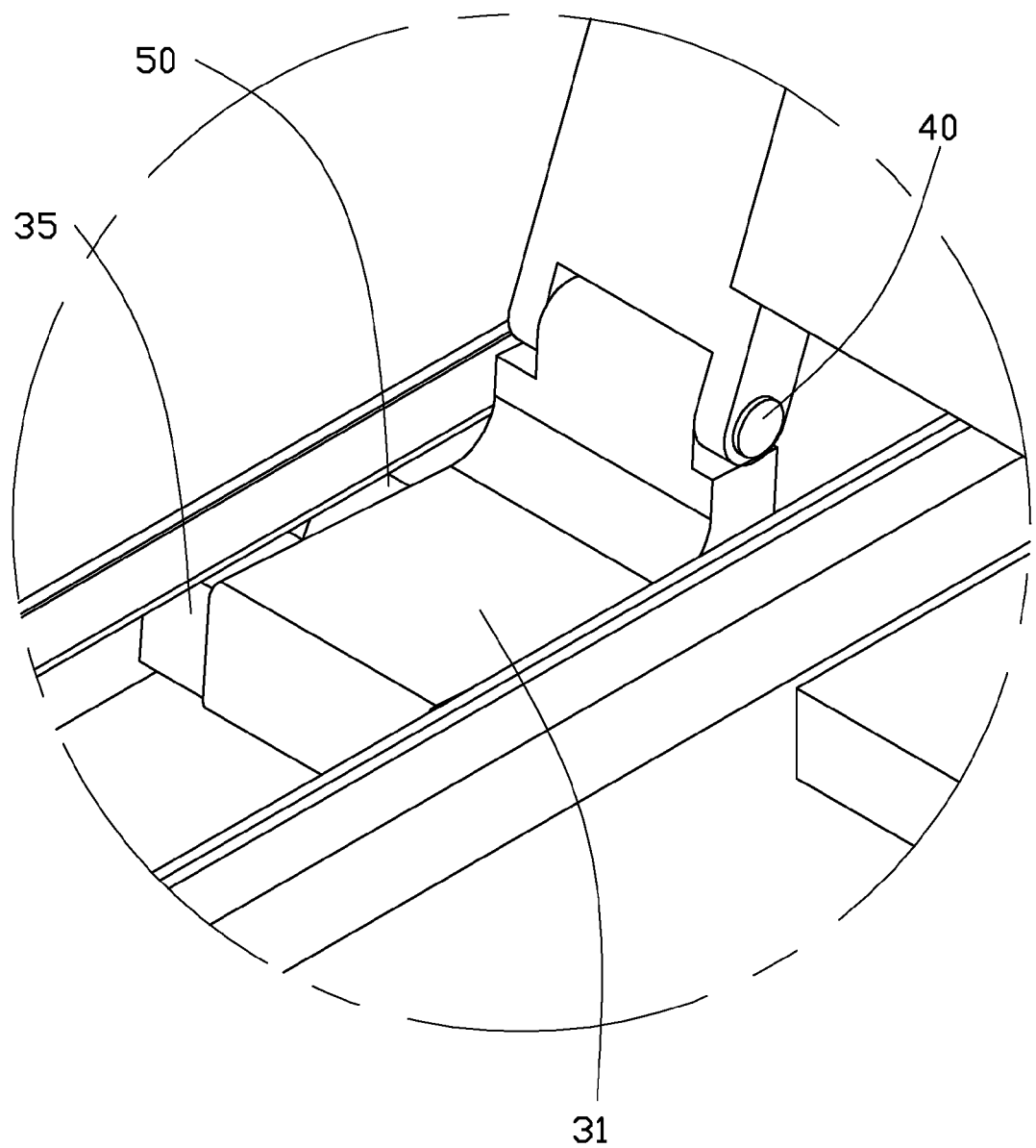
FIG. 7 is an enlarged view of a circled portion VII of FIG. 6.

FIG. 1 shows that the notebook computer 1 is in the first deployed position, and FIG. 6 shows that the notebook computer 1 is in a second deployed position. When an external force is exerted on the connecting member 30 in the first deployed position, the second shaft 50 leaves the circular holes 25 to be received in the guiding grooves 23, so that the block 31 is slidable along the bottom of the slide channel 21. Therefore, the connecting member 30 is retained in the second deployed position, and the screen panel 10 is slidable relative to the main body 20 along the slide channel 21.

In another embodiment, the second shaft 50 is replaced by circular protruding blocks located at two sides of the connecting member 30, so that the through hole 36 is omitted.

While one embodiment has been described and illustrated, the disclosure is not to be constructed as being limited thereto. Various modifications can be made to the embodiments by those skilled in the art without departing from the true spirit and scope of the disclosure as defined by the appended claims.

What is claimed is:

1. A notebook computer, comprising:
   a screen panel;
   a main body defining two slide channels in an upper surface thereof and a receiving space at an end of each of the slide channels, the receiving space communicating with the corresponding slide channel, wherein a depth of the receiving space is greater than a depth of the slide channel, a pair of opposite guiding grooves is respectively formed in opposite inner sidewalls of each slide channel, a hole is defined in each inner sidewall of each slide channel at an end of the corresponding guiding groove adjacent to a bottom of the receiving space and communicating with the corresponding guiding groove;
   two connecting members, connecting the screen panel to the main body, each of the connecting members comprising a block, wherein two protruding blocks are formed on opposite sides of the block, respectively, the block defines a through hole adjacent to the protruding blocks; and
   two shafts;

wherein a thickness of each protruding block is less than a width of the guiding groove, the shaft extends through the through hole of the block and two ends of the shaft are inserted in the two opposite guiding grooves, the receiving space is configured to receive the connecting member in a first deployed position where the two ends of the shaft are engagingly received in the two opposite holes, and the block tilts relative to a bottom of the slide channel; when an external force is exerted on the connecting member, the shaft moves out of the hole and moves into the guiding groove, the block is slidable on and along the bottom of the slide channel, and the shaft is slidably received in the guiding grooves in a second deployed position.

2. The notebook computer according to claim 1, wherein the connecting member is a unitary body.

3. The notebook computer according to claim 1, wherein two pairs of protrusions extend from two ends, respectively, of one side of the notebook computer adjacent to the main body and each pair of spaced protrusions defines two oppositely-facing through holes.

4. The notebook computer according to claim 3, wherein the block include a rear end defining a shaft through hole.

5. The notebook computer according to claim 4, further comprising a second shaft, wherein the second shaft is received in the two opposite through holes of the protrusions and the shaft through hole, thereby enable the screen panel to be rotatable relative to the main body.

6. A notebook computer comprising:
   a screen panel;
   a main body defining two slide channels in an upper surface thereof and a receiving space at an end of each of the slide channels, the receiving space communicating with the corresponding slide channel, wherein a depth of the receiving space is greater than a depth of the slide channel, a pair of opposite guiding grooves is respectively formed in opposite inner sidewalls of each slide channel, a hole is defined in each inner sidewall of each slide channel at an end of the corresponding guiding groove adjacent to a bottom of the receiving space and communicating with the corresponding guiding groove;
   two connecting members, connecting the screen panel to the main body, each of the connecting members comprising a block, wherein two rectangular protruding blocks and two circular protruding blocks are formed on opposite sides of the block, respectively;
   wherein a thickness of each rectangular protruding block is less than a width of the guiding groove, two distal ends of the circular protruding blocks are inserted in the two opposite guiding grooves, the receiving space is configured to receive the connecting member in a first deployed position where two distal ends of the two circular protruding blocks are engagingly received in the two opposite holes, and the block tilts relative to a bottom of the slide channel; when an external force is exerted on the connecting member, the two distal ends of the two circular protruding blocks move out of the hole and move into the guiding groove, the block is slidable on and along the bottom of the slide channel, and the two distal ends of the two circular protruding blocks are slidably received in the two guiding grooves in a second deployed position.

7. The notebook computer according to claim 6, wherein the connecting member is a unitary body.

8. The notebook computer according to claim 6, wherein two pairs of protrusions extend from two ends, respectively, of one side of the notebook computer adjacent to the main body and each pair of spaced protrusions defines two oppositely-facing through holes.

9. The notebook computer according to claim 8, wherein the block includes a rear end defining a shaft through hole.

10. The notebook computer according to claim 9, further comprising a shaft, wherein the shaft is received in the two opposite through holes of the protrusions and the shaft through hole, thereby, enable the screen panel to be rotatable relative to the main body.

\* \* \* \* \*